(12) United States Patent
Weremchuk

(10) Patent No.: US 9,068,864 B2
(45) Date of Patent: Jun. 30, 2015

(54) GAUGE PROTECTOR

(75) Inventor: Peter Weremchuk, Simsbury, CT (US)

(73) Assignee: Irwin Industrial Tool Company, Huntersville, NC (US)

(*) Notice: Subject to any disclaimer, the term of this patent is extended or adjusted under 35 U.S.C. 154(b) by 592 days.

(21) Appl. No.: 13/426,249

(22) Filed: Mar. 21, 2012

(65) Prior Publication Data
US 2012/0240676 A1 Sep. 27, 2012

Related U.S. Application Data

(60) Provisional application No. 61/454,925, filed on Mar. 21, 2011, provisional application No. 61/454,918, filed on Mar. 21, 2011.

(51) Int. Cl.
G01D 11/24 (2006.01)
(52) U.S. Cl.
CPC ..................... G01D 11/24 (2013.01)
(58) Field of Classification Search
None
See application file for complete search history.

(56) References Cited

U.S. PATENT DOCUMENTS

| 4,420,013 | A | 12/1983 | DiBlasio |
| 5,197,330 | A | 3/1993 | Onodera |
| 5,367,908 | A * | 11/1994 | McKenzie ...................... 73/431 |
| 5,652,391 | A | 7/1997 | Kingsford et al. |
| 6,085,597 | A | 7/2000 | Miller et al. |
| 6,164,139 | A | 12/2000 | Krimmer |
| 6,318,407 | B1 * | 11/2001 | Kohn et al. .................... 137/557 |
| 6,774,320 | B2 * | 8/2004 | Simons ......................... 177/147 |
| D579,809 | S | 11/2008 | Lin |
| D612,277 | S | 3/2010 | Cain et al. |
| 2006/0196547 | A1 * | 9/2006 | Trettin et al. ............ 137/355.16 |

OTHER PUBLICATIONS http://www.stridetool.com/tools/autospecialty/gauges_01.html, Stride Tool Precision Refrigerant Gauges product information; Copyright © 2009 Stride Tool Inc.

* cited by examiner

Primary Examiner — Robert R Raevis
(74) Attorney, Agent, or Firm — Dennis J. Williamson; Moore & Van Allen PLLC

(57) ABSTRACT

A gauge protector extends about an exterior surface of the gauge. A first relatively soft zone of the protector protects the gauge from damage by shock or impact. A second relatively hard zone of the protector is located adjacent to the first relatively soft zone and is resistant to abrasion for protecting the gauge from damage by contact with abrasive surfaces.

27 Claims, 4 Drawing Sheets

GAUGE PROTECTOR

CROSS-REFERENCE TO RELATED APPLICATIONS

The patent application claims benefit under 35 U.S.C. §119 (e) to U.S. provisional application Ser. No. 61/454,925, filed Mar. 21, 2011, titled "Gauge Protector", which is hereby expressly incorporated by reference as part of the present disclosure. Furthermore, this application contains related subject matter as co-filed application entitled "Device and Method for Taking Dual Temperature HVAC Readings," filed on Mar. 21, 2012, claiming benefit under 35 U.S.C. §119(e) to U.S. provisional application Ser. No. 61/454,918, filed on Mar. 21, 2011, which is also hereby expressly incorporated by reference as part of the present disclosure.

FIELD OF THE INVENTION

The present invention relates to gauges such as HVAC gauges, and more particularly, relates to protecting gauges, such as HVAC gauges, from shock, impact and/or contact with abrasive surfaces.

BACKGROUND INFORMATION

Gauges, such as gauges on HVAC manifolds, are susceptible to damage. Frequently, the gauges and/or manifolds including such gauges are dropped, hit with other tools, debris or other objects, or are thrown about in a truck or at a worksite. As a result, the lenses crack or break, or the impact or shock is sufficient to require recalibration. At times, the damage due to such impact or shock is so severe that the gauge cannot be re-calibrated. Some prior art gauges have been wrapped in heavy rubber or combinations of rubber and plastic. Although the rubber provides some shock absorption, it is typically very hard and thus provides minimal protection.

Accordingly, it is an object of the present invention to overcome one or more of the above-described drawbacks and/or disadvantages of the prior art.

SUMMARY OF THE INVENTION

A gauge protector configured to extend along an exterior surface of a gauge and includes (i) at least one first relatively soft zone for protecting the gauge from damage by shock or impact, and (ii) at least one second relatively hard zone adjacent to a respective first relatively soft zone that is resistant to abrasion for protecting the gauge from damage by contact with abrasive surfaces.

In some embodiments, the first zone defines a first density, and the second zone defines a second density that is greater than the first density. In some embodiments, the first zone defines a first durometer, and the second zone defines a second durometer that is greater than the first durometer. In some such embodiments, the first durometer is within the range of about 25 Shore A to about 55 Shore A, and the second durometer is within the range of about 70 Shore A to about 100 Shore A. In some embodiments, the first and second zones are formed of synthetic or natural rubber and/or other polymeric materials. In some such embodiments, the first and second zones are co-molded to each other, such as by over-molding the second zone to the first zone.

In some embodiments, the first zone defines an interior portion of the protector, and the second zone defines an exterior portion of the protector. Some embodiments further include a base attachable to the gauge wherein the first and second zones are formed on the base. In some such embodiments, the first and second zones are co-molded with the base, such as by over-molding.

In some embodiments, the first zone is formed between at least part of the second zone and the gauge. In some such embodiments, the second zone includes at least one abrasion resistant surface that extends along at least a portion of a periphery of a face of the gauge. The at least one abrasion resistant surface can project outwardly relative to the face of the gauge. In some such embodiments, the at least one abrasion resistant surface extends substantially completely about the periphery of the face of the gauge and projects outwardly therefrom.

In some embodiments, the second zone defines first and second abrasion resistant surfaces radially spaced relative to each other and defining an angularly extending gap therebetween. The first and second abrasion resistant surfaces project outwardly relative to the face of the gauge. In some such embodiments, the second zone further includes a plurality of ribs extending between the first and second abrasion resistant surfaces and angularly spaced relative to each other. In some such embodiments, the plurality of ribs includes pairs of ribs defining relatively small angularly extending gaps between the ribs of each pair, and relatively large angularly extending gaps between the pairs of ribs.

In some embodiments, the second abrasion resistant surface is spaced radially inwardly relative to the first abrasion resistant surface. In some such embodiments, at least a portion of the second abrasion resistant surface projects outwardly relative to the face of the gauge a greater distance than the first abrasion resistant surface. In some such embodiments, such portion of the second abrasion resistant surface defines a visor extending over and projecting outwardly relative to an upper region of the face of the gauge.

In accordance with another aspect, a gauge protector is configured to extend about an exterior surface of a gauge and includes (i) first relatively soft means for protecting the gauge from damage by shock or impact, and (ii) second relatively hard means adjacent to the first means that is resistant to abrasion for protecting the gauge from damage by contact with abrasive surfaces. In some embodiments, the first means is defined by a first relatively soft material extending between at least a portion of the second means and the gauge, and the second means is formed by a second relatively hard material in comparison to the first material. In some such embodiments, the first means is a first relatively soft rubber or other polymeric material, and the second means is a second relatively hard rubber or other polymeric material in comparison to the first material.

One advantage of the present invention is that a first relatively soft zone of material protects the gauge from shock or impact, whereas a second zone of relatively hard material protects the gauge from damage by contact with abrasive surfaces. Accordingly, the gauge protector of the present invention can provide significant protection for gauges, such as HVAC gauges, that can prolong the useful and/or operational lives of such gauges and can allow for less recalibration than required by prior art gauges. Yet another advantage of the currently preferred embodiments of the present invention is that the second zone can form a visor extending over an upper portion of the face of the gauge to facilitate viewing and reading the gauge.

These and other objects and advantages of the present invention, and/or of the currently preferred embodiments thereof, will become more readily apparent in view of the following detailed description and accompanying drawings.

DETAILED DESCRIPTION OF EMBODIMENTS OF THE INVENTION

Figure 1A:
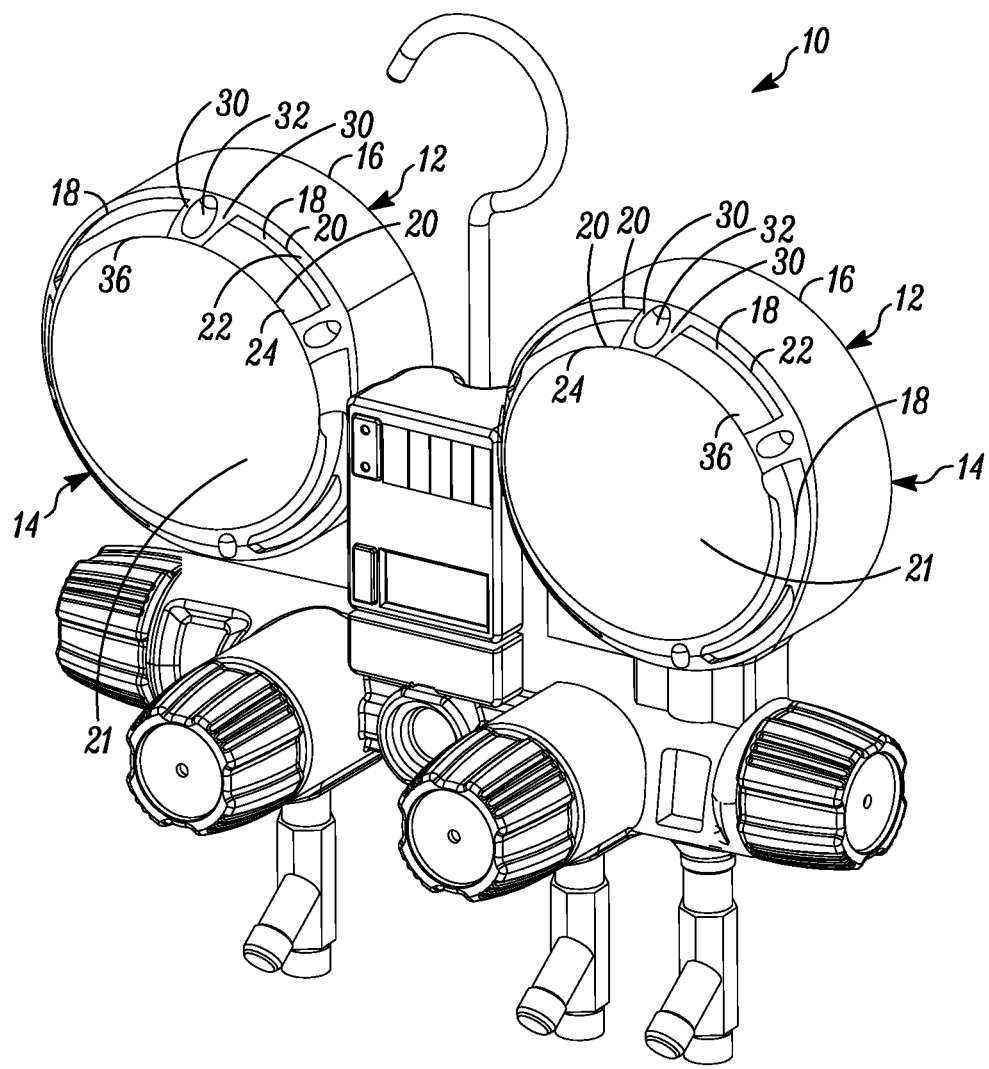
FIG. 1A is a perspective view of a first embodiment of a gauge protector for an analog HVAC manifold as attached to a manifold.

In FIG. 1A, an analog HVAC manifold including a gauge protector embodying the present invention is indicated generally by the reference numeral 10. The HVAC manifold, examples of which are described in the above-referenced co-filed application, entitled "Device and Method for Taking Dual Temperature HVAC Readings," incorporated herein by reference, includes two analog gauges 12, and each analog gauge 12 includes a respective gauge protector 14. Each gauge protector 14 includes a base or frame 16, a first relatively soft zone 18 for protecting the gauge from damage by shock or impact, and a second relatively hard zone 20 that is resistant to abrasion for protecting the gauge from damage by contact with abrasive surfaces. As can be seen, the first relatively soft zone 18 is located between the second relatively hard zone 20 and the face 21 of the respective gauge 12.

The first zone 18 defines a first density, and the second zone 20 defines a second density that is greater than the first density. In the illustrated embodiment, the first zone defines a first durometer, and the second zone defines a second durometer that is greater than the first durometer. For example, the first durometer can be within the range of about 25 Shore A to about 55 Shore A, and the second durometer can be within the range of about 70 Shore A to about 100 Shore A. The first and second zones 18, 20 are formed of synthetic or natural rubber or other polymeric materials. In the illustrated embodiment, the first and second zones 18, 20 are co-molded to each other, such as by over molding the second zone 20 to the first zone 18. However, as should be recognized by those of ordinary skill in the pertinent art based on the teachings herein, the first and second zones may be formed of any of numerous different suitable materials, and may be manufactured in any of numerous suitable different ways, that are currently known or that later become known.

The second zone 20 defines first and second abrasion resistant surfaces 22, 24 radially spaced relative to each other and defining an angularly extending gap 26 therebetween. The first and second abrasion resistant surfaces 22, 24 project outwardly relative to the face 21 of the respective gauge 12. A plurality of ribs 30 extend between the first and second abrasion resistant surfaces 22, 24 and are angularly spaced relative to each other. The plurality of ribs 30 includes pairs of ribs defining relatively small angularly extending gaps 32 between the ribs of each pair, and relatively large angularly extending gaps 34 between the pairs of ribs. As shown in FIG. 1A, the area of the ribs 30 defines a tapered portion of the protector 14, extending outward from the face 21 of the gauge 12, forming, for example, a visor.

The second abrasion resistant surface 24 is spaced radially inwardly relative to the respective first abrasion resistant surface 22. As can be seen, an upper portion 36 of each second abrasion resistant surface projects outwardly relative to the face 21 of the gauge a greater distance than the respective first abrasion resistant surface 22, and thereby forms a visor extending over and projecting outwardly relative to an upper region of the face of the respective gauge.

Figure 1B:
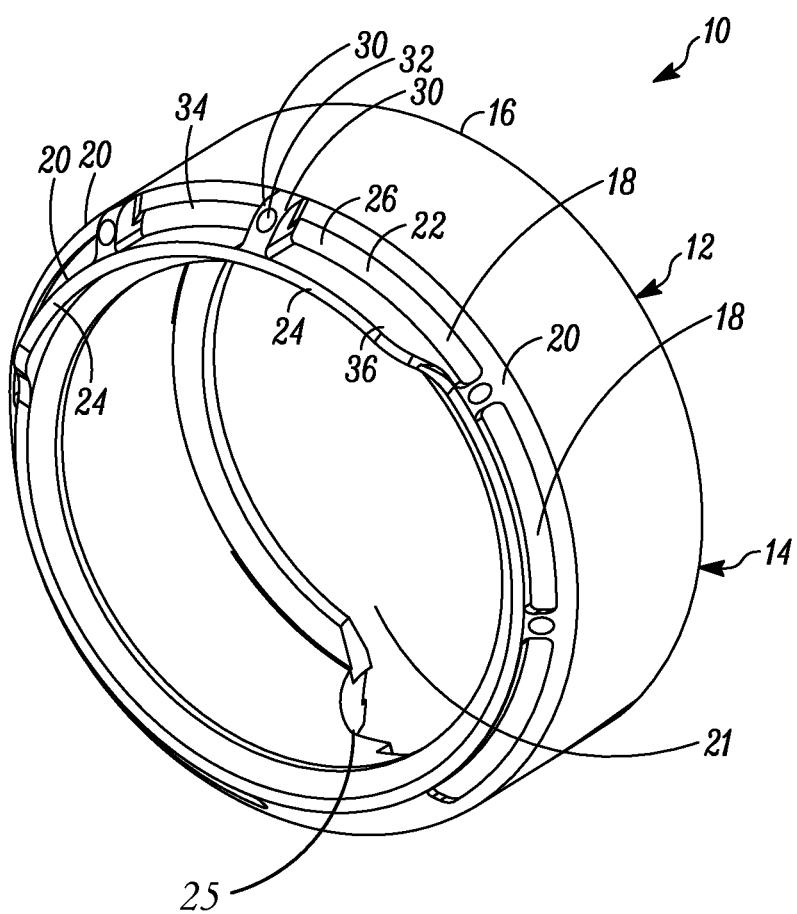
FIG. 1B is a perspective view of a single gauge protector of a second embodiment, separated from the manifold.

As shown in FIG. 1B, a second embodiment of a gauge protector 10 is shown. The gauge protector of FIG. 1B is substantially similar to the gauge protector described and shown with respect to FIG. 1A, and therefore like numbers are shown to designate similar features. In the embodiment shown in FIG. 1B, the ribs 30 may have a slightly different configuration, and those of ordinary skill in the art will appreciate that other various configuration of the ribs and forward facing elements of the gauge protector may have various configurations and/or orientations, without departing from the scope of the appended claims.

Also, as shown in FIG. 1B, the gauge protector 14 may include a recess or cut-out 25 to accommodate a nozzle, tube, fitting, or other element of the gauge that may be used to engage the gauge with a manifold. The gauge protector 14, as shown in FIG. 1B, is configured to fit around the structure of a gauge (not shown), and may provide a secure fitting around the gauge (see FIG. 1A) when the gauge is inserted into the gauge protector 14. Although shown as a single cut-out 25, those skilled in the art will appreciate that various constructions and configurations of the gauge protector may be used to allow for attachment to a manifold or other device of the gauge to be protected.

Figure 2A:
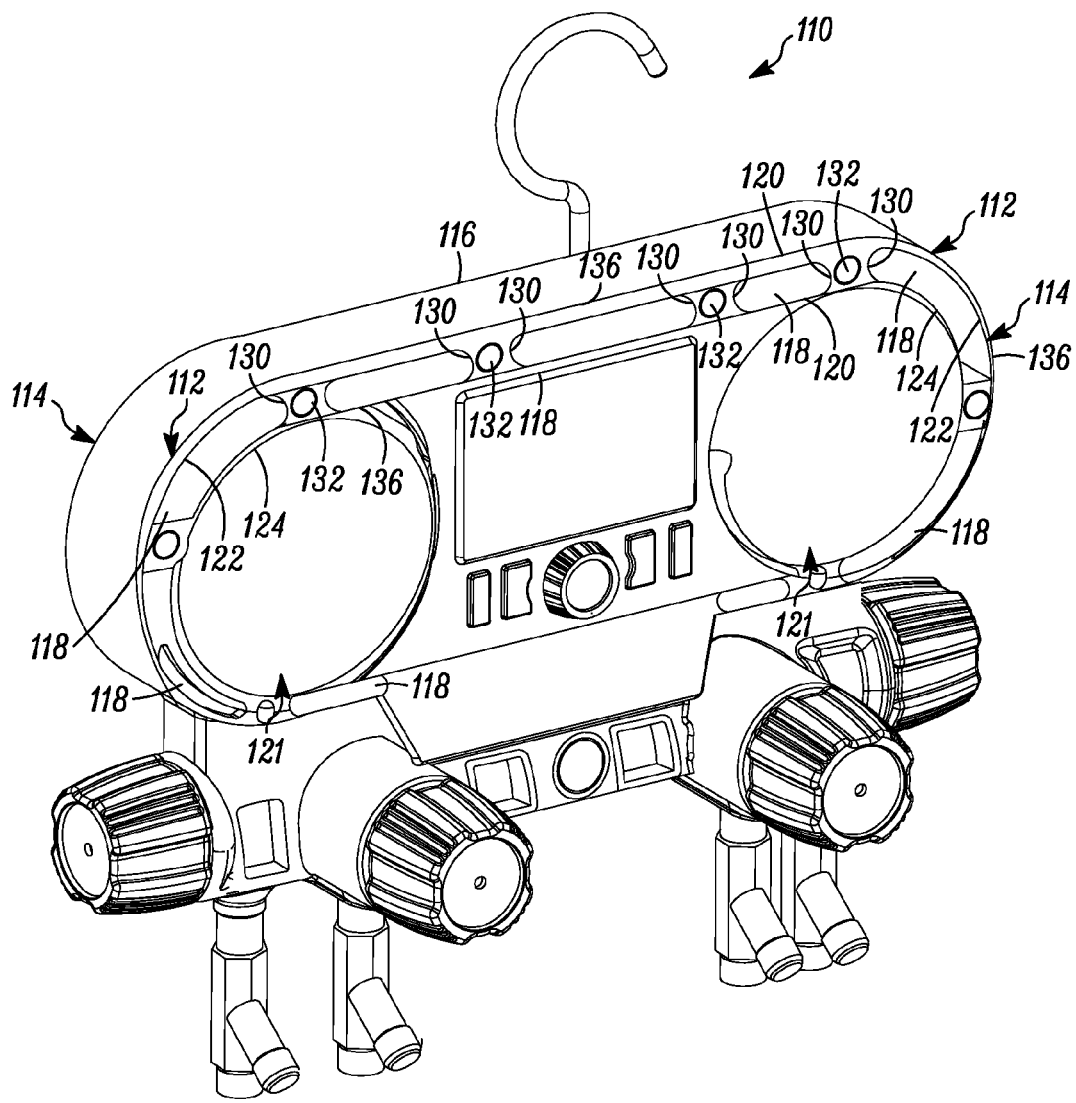
FIG. 2A is a perspective view of a third embodiment of a gauge protector for a digital HVAC manifold as attached to the manifold.

In FIG. 2A, a digital HVAC manifold including a gauge protector is indicated generally by the reference numeral 110. The manifold and gauge protector 110 is substantially similar to the manifold and gauge protector 10 described above with reference to FIG. 1, and therefore like reference numerals preceded by the numeral "1" are used to indicate like elements. A primary difference between the manifold and gauge protector 110 is that the same gauge protector 114 protects both digital gauges 112, 112. The gauge protector 114 includes a first abrasion resistant surface 122 that forms a visor extending across the upper portion of the manifold and both gauges, and extending downwardly along the opposite sides or lateral edges of the manifold along about the upper half of each gauge.

Figure 2B:
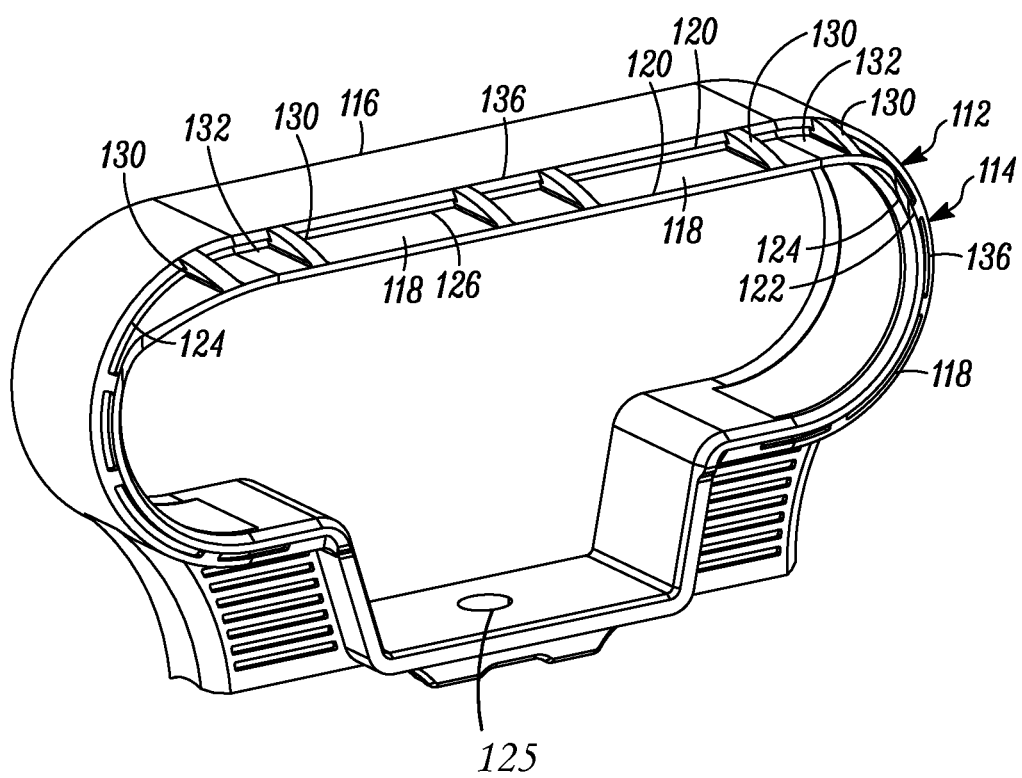
FIG. 2B is a perspective view of a digital gauge protector of a fourth embodiment, separated from the manifold.

As shown in FIG. 2B, a second embodiment of a digital gauge protector 110 is shown. The gauge protector of FIG. 2B is substantially similar to the gauge protector described and shown with respect to FIG. 2A, and therefore like numbers are shown to designate similar features. In the embodiment shown in FIG. 2B, the ribs 130 and gaps 132 have a different structure than that shown in FIG. 2A, as does the shape of base 116. Those of ordinary skill in the art will appreciate the gauge protector may have various configurations and/or orientations, without departing from the scope of the appended claims.

Furthermore, as shown in FIG. 2B, the gauge protector 114 includes a hole or cut-out 125. The cut-out 125 is configured to accommodate a nozzle, tube, fitting, or other element of the gauge that may be used to engage the gauge with a manifold or other component. Although shown as a single cut-out 125, those skilled in the art will appreciate that various constructions and configurations of the gauge protector may be used to allow for attachment of the gauge to be protected to attached to a manifold or other device.

As shown in the embodiments of FIGS. 1A and 2A, the gauge protectors are installed on the gauge to be protected. In the embodiments of FIGS. 1B and 2B, the gauge protectors are shown separated from the gauges. The gauge protectors may be configured to conform to and/or fit about the gauges to provide adequate protection to the gauges. The first zone is a softer material which allows for impact or shock absorption and is closer to the surface of the gauge. The second zone is a harder material configured to protect from abrasion or other damage to the gauge and is exterior to the first zone. Accordingly, when a gauge protector disclosed herein is installed or fitted onto a gauge, the gauge protector provides both protection with respect to shock or impacts and to abrasion and other types of damage.

As should be recognized by those of ordinary skill in the pertinent art based on the teachings herein, numerous changes and modifications may be made to the above-described and other embodiments of the present invention without departing from its scope as defined in the appended claims. For example, the gauge protector may be used with any of numerous different types of gauges and/or HVAC manifolds that are currently known or that later become known. In addition, the gauge protector may be attachable to the respective gauge(s) or manifold in any of numerous different ways that are currently known or later become known. Alternatively, the gauge protector may be detachable from the respective gauge(s) or manifold. In addition, the gauge protector may include additional zones and/or surfaces for protecting the gauge from shock, impact, abrasion or other undesirable affects. Accordingly, this detailed description of embodiments is to be taken in an illustrative as opposed to a limiting sense.

What is claimed is:

1. A gauge protector configured to extend along an exterior surface of a gauge comprising: at least one relatively soft first zone configured to protect the gauge from damage by shock or impact, and at least one relatively hard second zone adjacent to a respective relatively soft first zone that is resistant to abrasion and configured to protect the gauge from damage by contact with an abrasive surface wherein the at least one first zone and the at least one second zone are co-molded to each other.

2. A gauge protector as defined in claim 1, wherein the at least one first zone defines a first density, and the at least one second zone defines a second density that is greater than the first density.

3. A gauge protector as defined in claim 1, wherein the at least one first zone has a first durometer hardness, and the at least one second zone has a second durometer hardness that is greater than the first durometer hardness.

4. A gauge protector as defined in claim 3, wherein the first durometer hardness is within the range of about 25 to about 55 Shore A, and the second durometer hardness is within the range of about 70 to about 100 Shore A.

5. A gauge protector as defined in claim 4, wherein the first and second zones comprise synthetic or natural rubber or other polymeric materials.

6. A gauge protector as defined in claim 1, wherein the at least one second zone is over-molded to the at least one first zone.

7. A gauge protector as defined in claim 1, wherein the at least one first zone is over-molded to the at least one second zone.

8. A gauge protector as defined in claim 1, wherein the at least one second zone is configured to be exterior to the at least one first zone relative to a gauge to be protected.

9. A gauge protector as defined in claim 1, further including a base adapted for attachment to a gauge, and wherein the at least one first and the at least one second zones are attached to the base.

10. A gauge protector as defined in claim 9, wherein the at least one first and at least one second zones are co-molded with the base.

11. A gauge protector as defined in claim 1, wherein the at least one first zone is configured to be disposed between at least part of the at least one second zone and a face of a gauge when installed on a gauge.

12. A gauge protector as defined in claim 11, wherein the at least one second zone comprises at least one abrasion resistant surface and is configured to extend along at least a portion of a periphery of a face of a gauge when installed on a gauge.

13. A gauge protector as defined in claim 12, wherein the at least one abrasion resistant surface is configured to project outwardly relative to the face of a gauge when installed on a gauge.

14. A gauge protector as defined in claim 13, wherein the at least one abrasion resistant surface is configured to extend substantially completely about the periphery of a face of a gauge and project outwardly therefrom when installed on a gauge.

15. A gauge protector as defined in claim 13, wherein the at least one second zone comprises first and second abrasion resistant surfaces radially spaced relative to each other and defining an angularly extending gap therebetween about a circumference of the gauge protector, and wherein the first and second abrasion resistant surfaces are configured to project outwardly relative to a face of a gauge when installed on a gauge.

16. A gauge protector as defined in claim 15, wherein the at least one second zone further comprises a plurality of ribs extending between the first and second abrasion resistant surfaces and angularly spaced relative to each other about the circumference of the gauge protector.

17. A gauge protector as defined in claim 16, wherein the plurality of ribs includes pairs of ribs defining relatively small angularly extending gaps about the circumference of the gauge protector between ribs of each pair and relatively large angularly extending gaps about the circumference of the gauge protector between pairs of ribs.

18. A gauge protector as defined in claim 15, wherein the second abrasion resistant surface is spaced radially inwardly relative to the first abrasion resistant surface.

19. A gauge protector as defined in claim 18, wherein at least a portion of one of the first abrasion resistant surface and the second abrasion resistant surface is configured to project outwardly relative to a face of a gauge a greater distance than the other of the first and second abrasion resistant surfaces when installed on a gauge.

20. A gauge protector as defined in claim 19, wherein said at least a portion of one of the first abrasion resistant surface and the second abrasion resistant surface defines a visor configured to extend over and project outwardly relative to an upper region of a face of a gauge when installed on a gauge.

21. A gauge protector as defined in claim 20, wherein the visor defines an angular extent about the circumference of the gauge protector within the range of about 120° and about 180°.

22. A gauge protector as defined in claim 12, wherein the at least one abrasion resistant surface defines a visor configured to project outwardly relative to and over an upper portion of a face of a gauge when installed on a gauge.

23. A gauge protector as defined in claim 1, configured to receive a first gauge and a second gauge, wherein the at least one first zone extends between the at least one second zone and the first gauge and the second gauge when installed on a first gauge and a second gauge.

24. A gauge protector as defined in claim 23, wherein the at least one second zone forms a visor projecting outwardly relative to and extending over an upper region of the face of each of a first gauge and a second gauge and along an upper region of at least one side of each of a first gauge and a second gauge when installed on a first gauge and a second gauge.

25. A gauge protector as defined in claim 24, wherein the at least one second zone includes first and second abrasion resistant surfaces radially spaced relative to each other and defining an angularly extending gap therebetween about a circumference of the gauge protector and a plurality of crumple zones extending along at least a portion of the periphery of the face of each of a first gauge and a second gauge when installed on a first gauge and a second gauge.

26. A gauge protector configured to extend along an exterior surface of a gauge comprising: at least one relatively soft first zone configured to protect the gauge from damage by shock or impact, and at least one relatively hard second zone adjacent to a respective relatively soft first zone that is resistant to abrasion and configured to protect the gauge from damage by contact with an abrasive surface wherein the at least one first zone is configured to be disposed between at least part of the at least one second zone and a face of a gauge when installed on a gauge, the at least one second zone comprising at least one abrasion resistant surface configured to extend along at least a portion of a periphery of a face of a gauge when installed on a gauge, wherein the at least one second zone comprises first and second abrasion resistant surfaces radially spaced relative to each other and defining an angularly extending gap therebetween about a circumference of the gauge protector, and wherein the first and second abrasion resistant surfaces are configured to project outwardly relative to a face of a gauge when installed on a gauge, the at least one second zone further comprises a plurality of ribs extending between the first and second abrasion resistant surfaces and angularly spaced relative to each other about the circumference of the gauge protector, wherein the plurality of ribs includes pairs of ribs defining relatively small angularly extending gaps about the circumference of the gauge protector between ribs of each pair and relatively large angularly extending gaps about the circumference of the gauge protector between pairs of ribs.

27. A gauge protector configured to extend along an exterior surface of a gauge comprising: at least one relatively soft first zone configured to protect the gauge from damage by shock or impact, and at least one relatively hard second zone adjacent to a respective relatively soft first zone that is resistant to abrasion and configured to protect the gauge from damage by contact with an abrasive surface, wherein the at least one first zone is configured to be disposed between at least part of the at least one second zone and a face of a gauge when installed on a gauge, wherein the at least one second zone comprises at least one abrasion resistant surface configured to extend along at least a portion of a periphery of a face of a gauge when installed on a gauge, wherein the at least one abrasion resistant surface is configured to project outwardly relative to the face of a gauge when installed on a gauge, wherein the at least one second zone comprises first and second abrasion resistant surfaces radially spaced relative to each other and defining an angularly extending gap therebetween about a circumference of the gauge protector and configured to project outwardly relative to a face of a gauge when installed thereon, wherein the second abrasion resistant surface is spaced radially inwardly relative to the first abrasion resistant surface, and wherein at least a portion of one of the first abrasion resistant surface and the second abrasion resistant surface is configured to project outwardly relative to a face of a gauge a greater distance than the other of the first and second abrasion resistant surfaces when installed on a gauge such that said at least a portion of one of the first abrasion resistant surface and the second abrasion resistant surface defines a visor configured to extend over and project outwardly relative to an upper region of a face of a gauge when installed on a gauge, wherein the visor defines an angular extent about the circumference of the gauge protector within the range of about 120° and about 180°.

* * * * *